(12) United States Patent
Latta et al.

(10) Patent No.: US 8,385,596 B2
(45) Date of Patent: Feb. 26, 2013

(54) FIRST PERSON SHOOTER CONTROL WITH VIRTUAL SKELETON

(75) Inventors: Stephen Latta, Seattle, WA (US); Darren Bennett, Seattle, WA (US); Kevin Geisner, Mercer Island, WA (US); Relja Markovic, Seattle, WA (US); Kudo Tsunoda, Seattle, WA (US); Greg Snook, Sammamish, WA (US); Christopher H. Willoughby, Seattle, WA (US); Peter Sarrett, Redmond, WA (US); Daniel Lee Osborn, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 293 days.

(21) Appl. No.: 12/975,128

(22) Filed: Dec. 21, 2010

(65) Prior Publication Data

US 2012/0155705 A1 Jun. 21, 2012

(51) Int. Cl.
*G06K 9/00* (2006.01)
(52) U.S. Cl. ......... 382/103; 348/169; 715/757; 345/419
(58) Field of Classification Search .................. 382/100, 382/103, 106, 107, 258, 259, 181, 190, 195; 348/169–172; 345/419, 661, 664, 676, 679; 711/203; 715/757
See application file for complete search history.

(56) References Cited

U.S. PATENT DOCUMENTS

| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |

(Continued)

FOREIGN PATENT DOCUMENTS

| CN | 201254344 B | 6/2010 |
| EP | 0583061 A2 | 2/1994 |

(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — Anand Bhatnagar
(74) *Attorney, Agent, or Firm* — Alleman Hall McCoy Russell & Tuttle LLP

(57) ABSTRACT

A virtual skeleton includes a plurality of joints and provides a machine readable representation of a human target observed with a three-dimensional depth camera. A relative position of a hand joint of the virtual skeleton is translated as a gestured aiming vector control, and a virtual weapon is aimed in proportion to the gestured aiming vector control.

20 Claims, 17 Drawing Sheets

U.S. PATENT DOCUMENTS

| | | | |
|---|---|---|---|
| 4,980,871 A * | 12/1990 | Sieber et al. | 367/127 |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,471,541 A | 11/1995 | Burtnyk et al. | |
| 5,495,576 A | 2/1996 | Ritchey | |
| 5,516,105 A | 5/1996 | Eisenbrey et al. | |
| 5,524,637 A | 6/1996 | Erickson | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,054,991 A | 4/2000 | Crane et al. | |
| 6,061,644 A * | 5/2000 | Leis | 702/153 |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,335,977 B1 | 1/2002 | Kage | |
| 6,363,160 B1 | 3/2002 | Bradski et al. | |
| 6,384,819 B1 | 5/2002 | Hunter | |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,503,195 B1 | 1/2003 | Keller et al. | |
| 6,539,931 B2 | 4/2003 | Trajkovic et al. | |
| 6,554,706 B2 | 4/2003 | Kim et al. | |
| 6,570,555 B1 | 5/2003 | Prevost et al. | |
| 6,597,817 B1 * | 7/2003 | Silverbrook | 382/289 |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,681,031 B2 | 1/2004 | Cohen et al. | |
| 6,714,665 B1 | 3/2004 | Hanna et al. | |
| 6,720,949 B1 | 4/2004 | Pryor et al. | |
| 6,731,799 B1 | 5/2004 | Sun et al. | |
| 6,738,066 B1 | 5/2004 | Nguyen | |
| 6,750,866 B1 | 6/2004 | Anderson, III | |
| 6,765,726 B2 | 7/2004 | French et al. | |
| 6,788,809 B1 | 9/2004 | Grzeszczuk et al. | |
| 6,801,637 B2 | 10/2004 | Voronka et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,950,534 B2 | 9/2005 | Cohen et al. | |
| 7,003,134 B1 | 2/2006 | Covell et al. | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,113,918 B1 | 9/2006 | Ahmad et al. | |
| 7,121,946 B2 | 10/2006 | Paul et al. | |
| 7,170,492 B2 | 1/2007 | Bell | |
| 7,184,048 B2 | 2/2007 | Hunter | |
| 7,202,898 B1 | 4/2007 | Braun et al. | |
| 7,222,078 B2 | 5/2007 | Abelow | |
| 7,227,526 B2 | 6/2007 | Hildreth et al. | |
| 7,259,747 B2 | 8/2007 | Bell | |
| 7,308,112 B2 | 12/2007 | Fujimura et al. | |
| 7,317,836 B2 | 1/2008 | Fujimura et al. | |
| 7,348,963 B2 | 3/2008 | Bell | |
| 7,359,121 B2 | 4/2008 | French et al. | |
| 7,367,887 B2 | 5/2008 | Watabe et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |

| | | | |
|---|---|---|---|
| 7,753,785 B2* | 7/2010 | Nishimura | 463/32 |
| 7,756,297 B2* | 7/2010 | Pryor | 382/103 |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,249,334 B2* | 8/2012 | Berliner et al. | 382/154 |
| 8,295,546 B2* | 10/2012 | Craig et al. | 382/103 |
| 2002/0041327 A1 | 4/2002 | Hildreth et al. | |
| 2003/0166413 A1* | 9/2003 | Hayashida et al. | 463/30 |
| 2005/0020363 A1* | 1/2005 | Kawamoto et al. | 463/32 |
| 2008/0026838 A1 | 1/2008 | Dunstan et al. | |
| 2010/0199230 A1* | 8/2010 | Latta et al. | 715/863 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

Hodgins et al.,"Tracking and Modifying Upper-body Human Motion Data with Dynamic Simulation" Retrieved at<<http://graphics.cs.ucr.edu/papers/zordan:1999:TMU.pdf>>, 1999, pp. 11.

* cited by examiner

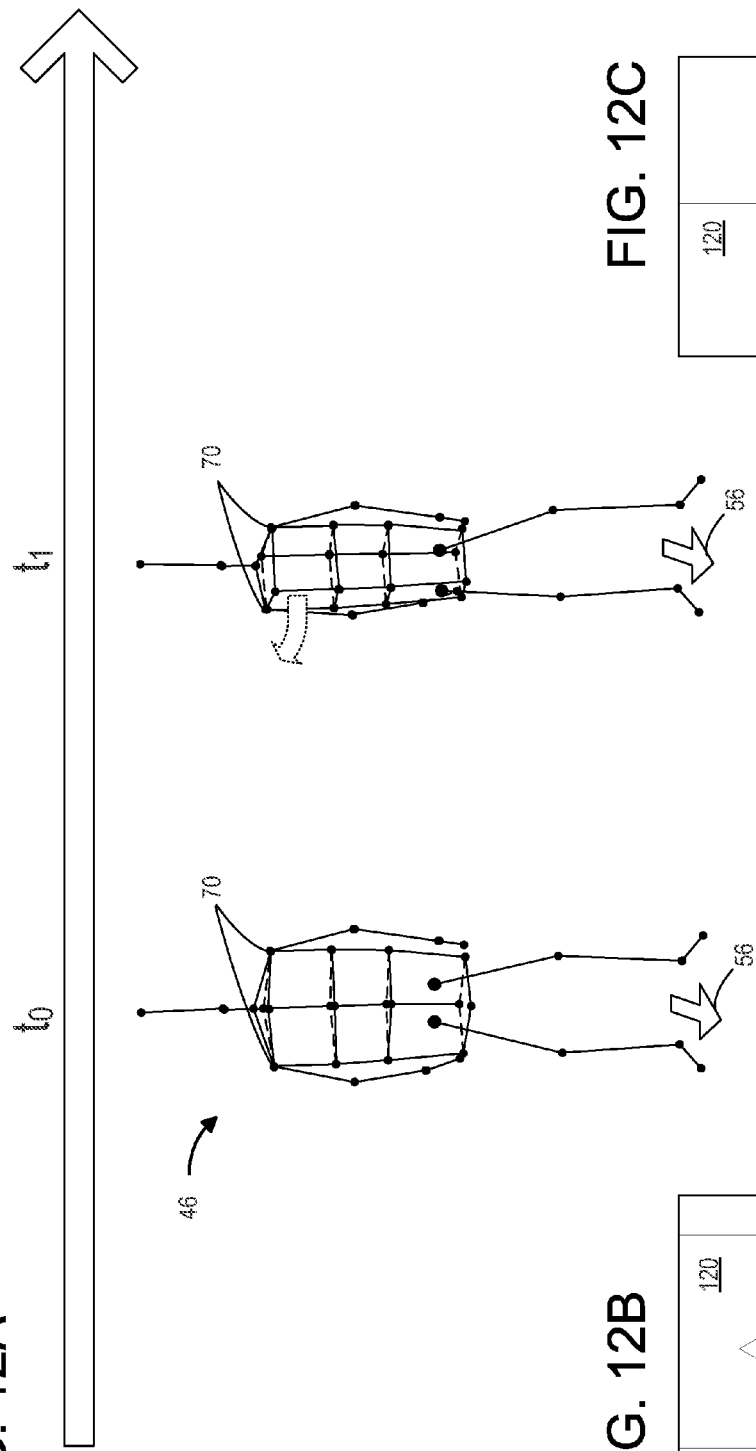
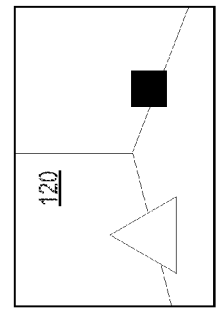

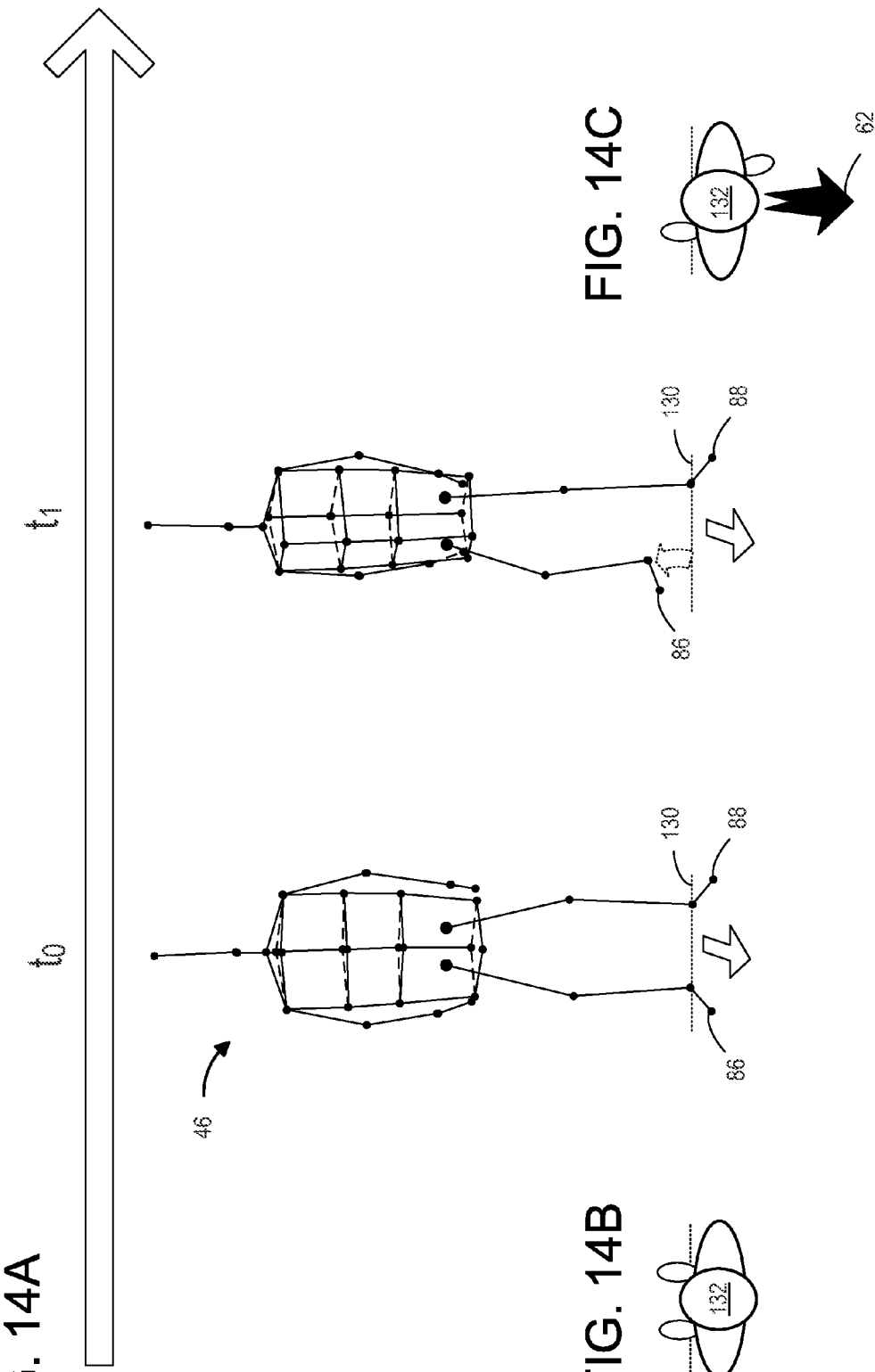

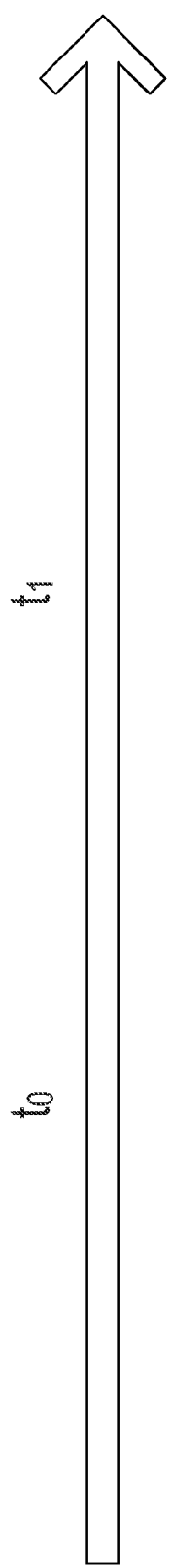
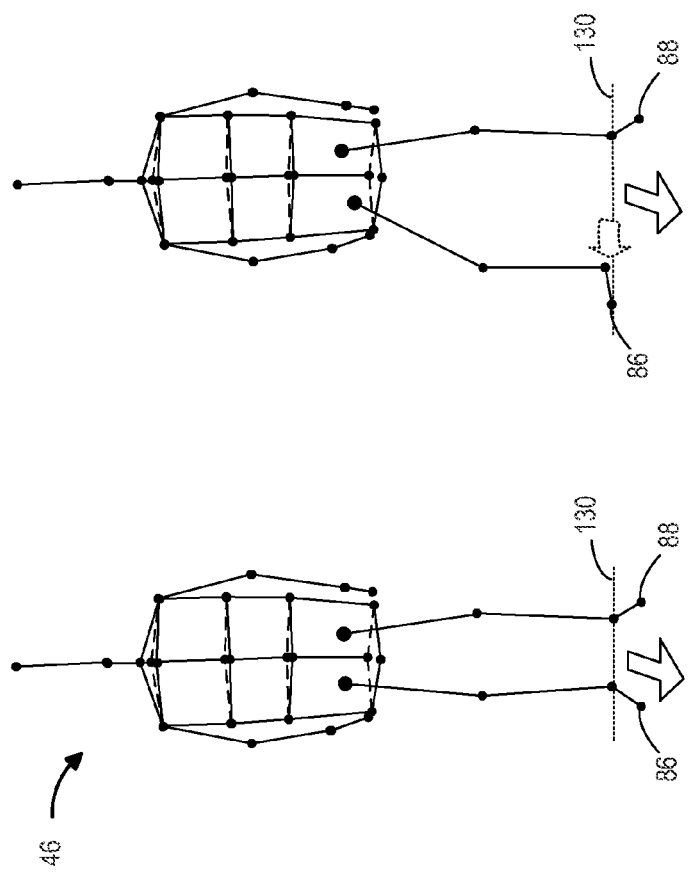
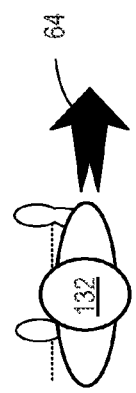
FIG. 15A
FIG. 15B
FIG. 15C

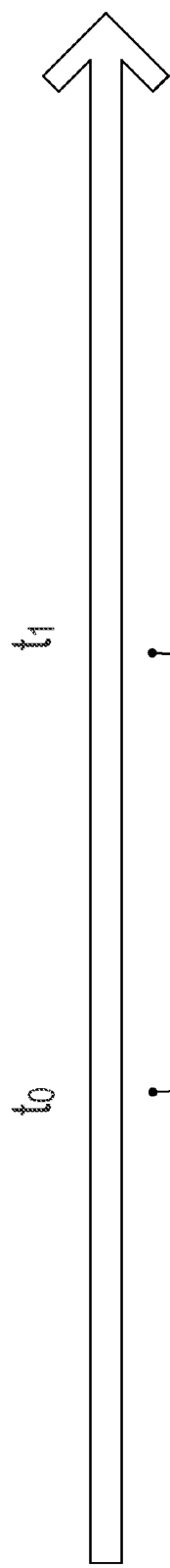
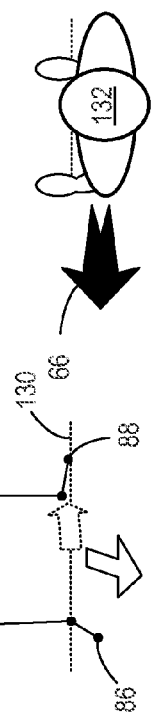
FIG. 16A
FIG. 16C
FIG. 16B

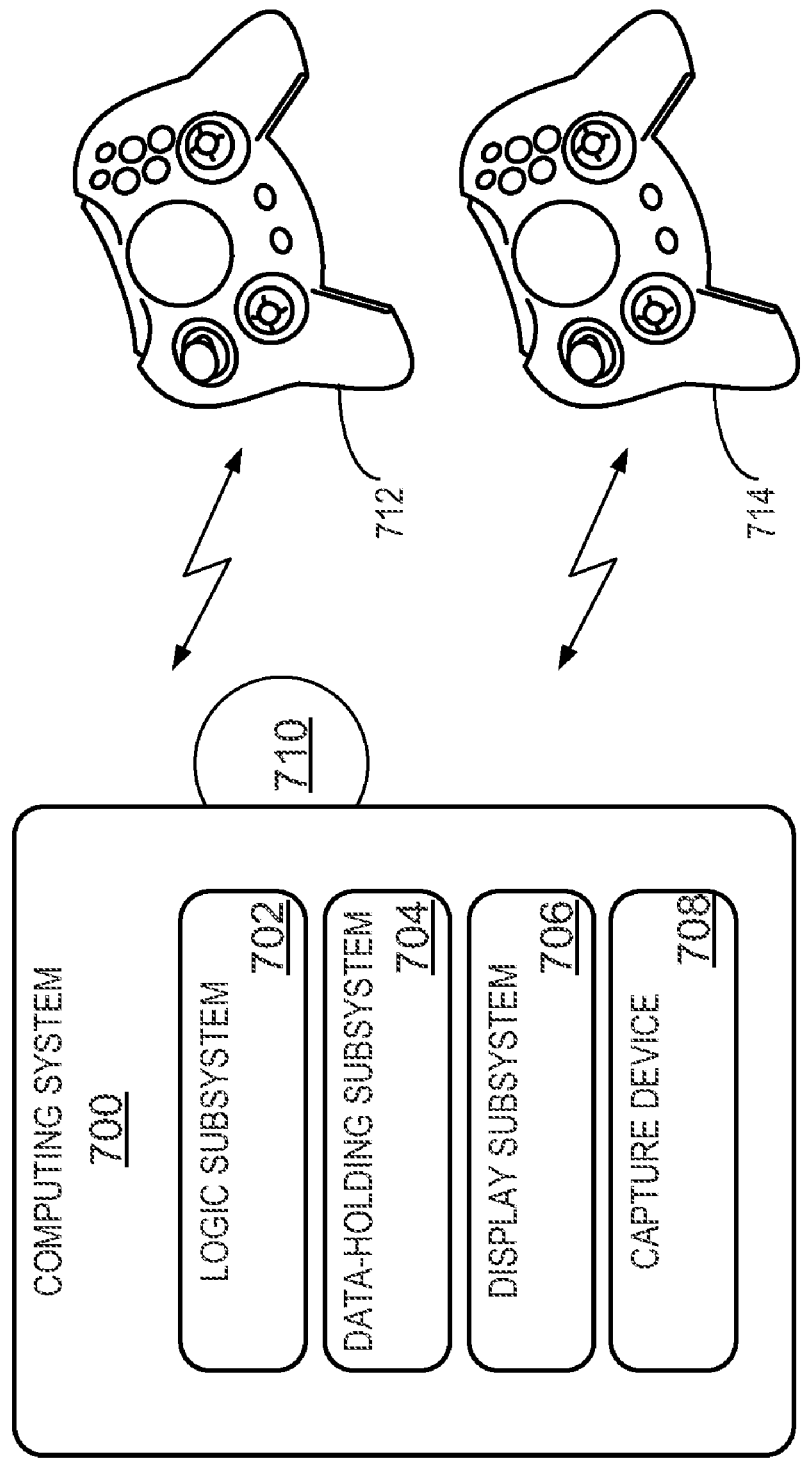

FIRST PERSON SHOOTER CONTROL WITH VIRTUAL SKELETON

BACKGROUND

While camera technology allows images of humans to be recorded, computers have traditionally not been able to use such images to accurately assess how a human is moving within the images. Recently, technology has advanced such that some aspects of a human's movements may be interpreted with the assistance of a plurality of special cameras and one or more tracking tags. For example, an actor may be carefully adorned with several tracking tags (e.g., retro-reflectors) that can be tracked with several cameras from several different positions. Triangulation can then be used to calculate the three-dimensional position of each reflector. Because the tags are carefully positioned on the actor, and the relative position of each tag to a corresponding part of the actor's body is known, the triangulation of the tag position can be used to infer the position of the actor's body. However, this technique requires special reflective tags, or other markers, to be used.

In science fiction movies, computers have been portrayed as intelligent enough to actually view human beings and interpret the motions and gestures of the human beings without the assistance of reflective tags or other markers. However, such scenes are created using special effects in which an actor carefully plays along with a predetermined movement script that makes it seem as if the actor is controlling the computer's scripted actions. The actor is not actually controlling the computer, but rather attempting to create the illusion of control.

SUMMARY

According to one aspect of the disclosure, a virtual skeleton includes a plurality of joints and provides a machine readable representation of a human target observed with a three-dimensional depth camera. A relative position of a hand joint of the virtual skeleton is translated as a gestured aiming vector control, and a virtual weapon is aimed in proportion to the gestured aiming vector control.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 3A-16C somewhat schematically show gestured weapon and navigation controls as translated from a virtual skeleton in accordance with embodiments of the present disclosure.

FIG. 17 schematically shows a computing system configured to translate a virtual skeleton into gestured weapon and navigation controls.

DETAILED DESCRIPTION

A depth-image analysis system, such as a 3D-vision gaming system, may include a depth camera capable of observing one or more players. As the depth camera captures images of a player within an observed scene, those images may be interpreted and modeled with one or more virtual skeletons. As described in more detail below, the virtual skeletons may be used as an input for controlling a first person shooter game. In other words, a depth camera can observe and model a human that is performing gestures designed to control a first person shooter, and the human target can be modeled with a virtual skeleton that the first person shooter can interpret as different controls. In this way, the human can control the first person shooter with gestures alone, avoiding conventional joysticks and/or other controllers.

Figure 1:
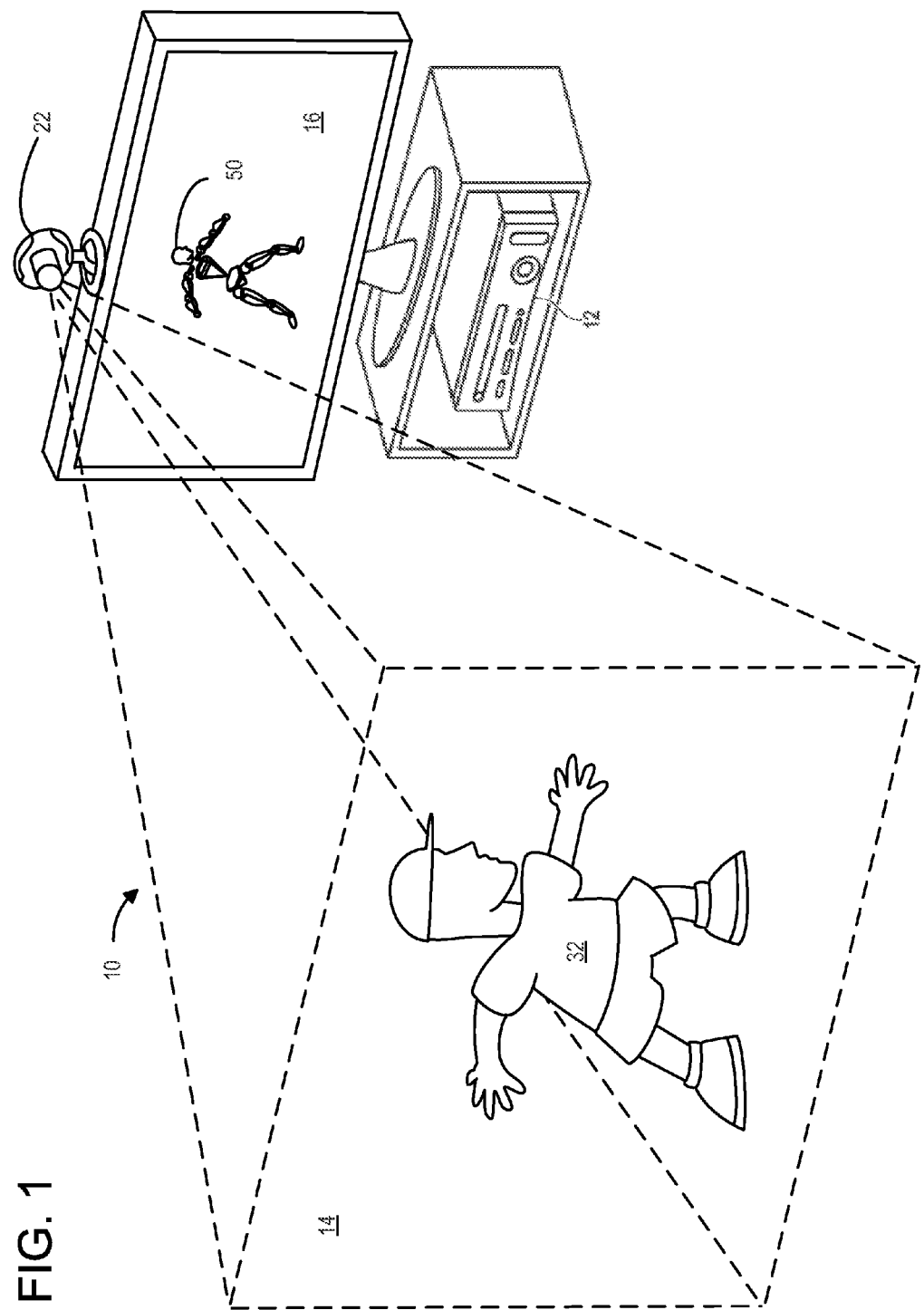
FIG. 1 shows a depth-image analysis system viewing an observed scene in accordance with an embodiment of the present disclosure.

FIG. 1 shows a nonlimiting example of a depth-image analysis system 10. In particular, FIG. 1 shows a gaming system 12 that may be used to play a variety of different games, play one or more different media types, and/or control or manipulate non-game applications and/or operating systems. FIG. 1 also shows a display device 16 such as a television or a computer monitor, which may be used to present; game visuals to game players. As one example, display device 16 may be used to visually present a virtual avatar 50 that human target 32 controls with his movements. The depth-image analysis system 10 may include a capture device, such as a depth camera 22, that visually monitors or tracks human target 32 within an observed scene 14. Depth camera 22 is discussed in greater detail with respect to FIGS. 2 and 17.

Human target 32 is shown here as a game player within observed scene 14. Human target 32 is tracked by depth camera 22 so that the movements of human target 32 may be interpreted by gaming system 12 as controls that can be used to affect the game being executed by gaming system 12. In other words, human target 32 may use his or her movements to control the game. The movements of human target 32 may be interpreted as virtually any type of game control. Some movements of human target 32 may be interpreted as controls that serve purposes other than controlling virtual avatar 50. As nonlimiting examples, movements of human target 32 may be interpreted as controls that steer a virtual racing car, shoot a virtual weapon, navigate a first-person perspective through a virtual world, or manipulate various aspects of a simulated world. Movements may also be interpreted as auxiliary game management controls. For example, human target 32 may use movements to end, pause, save, select a level, view high scores, communicate with other players, etc.

Depth camera 22 may also be used to interpret target movements as operating system and/or application controls that are outside the realm of gaming. Virtually any controllable aspect of an operating system and/or application may be controlled by movements of a human target 32. The illustrated scenario in FIG. 1 is provided as an example, but is not meant to be limiting in any way. To the contrary, the illustrated scenario is intended to demonstrate a general concept, which may be applied to a variety of different applications without departing from the scope of this disclosure.

The methods and processes described herein may be tied to a variety of different types of computing systems. FIG. 1 shows a nonlimiting example in the form of gaming system 12, display device 16, and depth camera 22. In general, a depth-image analysis system may include a computing system 700, shown in simplified form in FIG. 17, which will be discussed in greater detail below.

Figure 2:
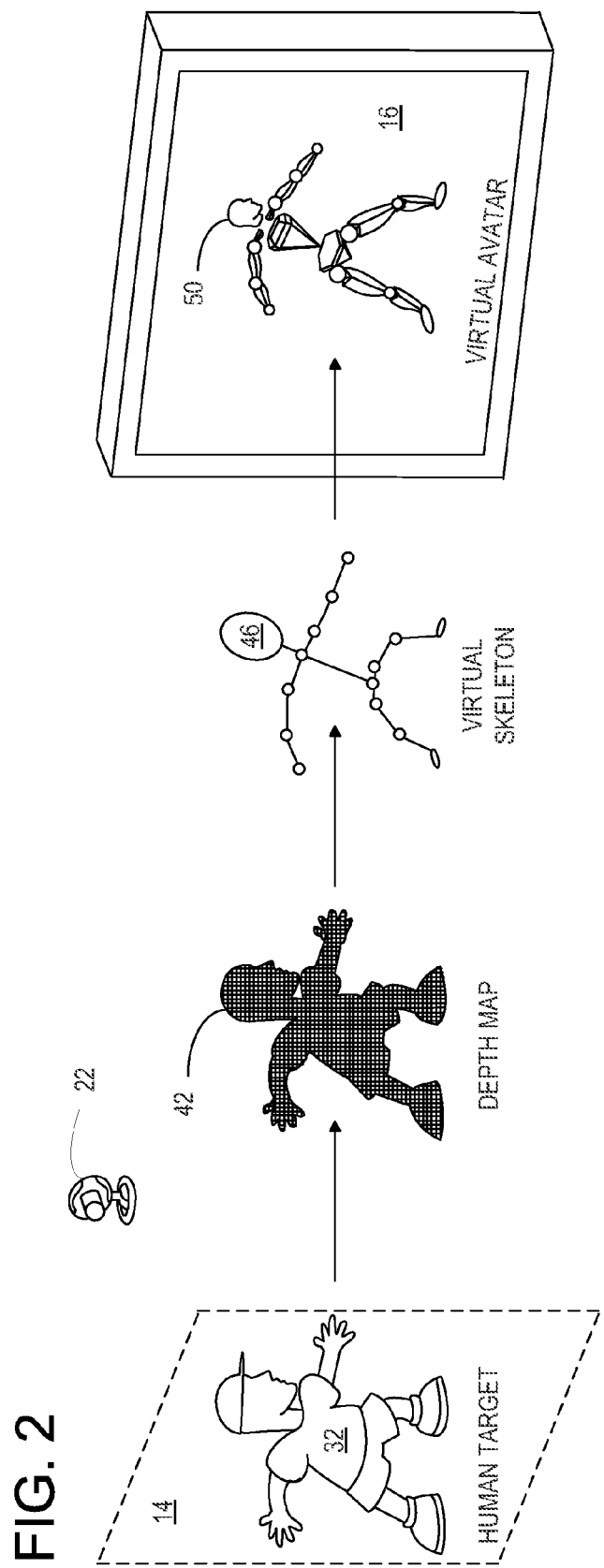
FIG. 2 somewhat schematically shows the modeling of a human target with a virtual skeleton.

FIG. 2 shows a simplified processing pipeline in which human target 32 in an observed scene 14 is modeled as a virtual skeleton 46 that can be used to draw a virtual avatar 50 on display device 16 and/or serve as a control input for controlling other aspects of a game, application, and/or operating system. It will be appreciated that a processing pipeline may include additional steps and/or alternative steps than those depicted in FIG. 2 without departing from the scope of this disclosure.

As shown in FIG. 2, human target 32 and the rest of observed scene 14 may be imaged by a capture device such as depth camera 22. The depth camera may determine, for each pixel, the depth of a surface in the observed scene relative to the depth camera. Virtually any depth finding technology may be used without departing from the scope of this disclosure. Example depth finding technologies are discussed in more detail with reference to capture device 708 of FIG. 17.

The depth information determined for each pixel may be used to generate a depth map 42. Such a depth map may take the form of virtually any suitable data structure, including but not limited to a matrix that includes a depth value for each pixel of the observed scene. In FIG. 2, depth map 42 is schematically illustrated as a pixelated grid of the silhouette of human target 32. This illustration is for simplicity of understanding, not technical accuracy. It is to be understood that a depth map generally includes depth information for all pixels, not just pixels that image human target 32, and that the perspective of depth camera 22 would not result in the silhouette depicted in FIG. 2.

Virtual skeleton 46 may be derived from depth map 42 to provide a machine readable representation of human target 32. In other words, virtual skeleton 46 is derived from depth map 42 to model human target 32. The virtual skeleton 46 may be derived from the depth map in any suitable manner. In some embodiments, one or more skeletal fitting algorithms may be applied to the depth map. The present disclosure is compatible with virtually any skeletal modeling techniques.

The virtual skeleton 46 may include a plurality of joints, each joint corresponding to a portion of the human target. In FIG. 2, virtual skeleton 46 is illustrated as a fifteen-joint stick figure. This illustration is for simplicity of understanding, not technical accuracy. Virtual skeletons in accordance with the present disclosure may include virtually any number of joints, each of which can be associated with virtually any number of parameters (e.g., three dimensional joint position, joint rotation, body posture of corresponding body part (e.g., hand open, hand closed, etc.) etc.). It is to be understood that a virtual skeleton may take the form of a data structure including one or more parameters for each of a plurality of skeletal joints (e.g., a joint matrix including an x position, a y position, a z position, and a rotation for each joint). In some embodiments, other types of virtual skeletons may be used (e.g., a wireframe, a set of shape primitives, etc).

As shown in FIG. 2, a virtual avatar 50 may be rendered on display device 16 as a visual representation of virtual skeleton 46. Because virtual skeleton 46 models human target 32 and the rendering of the virtual avatar 50 is based on the virtual skeleton 46, the virtual avatar 50 serves as a viewable digital representation of the human target 32. As such, movement of virtual avatar 50 on display device 16 reflects the movements of human target 32.

In some embodiments, only portions of a virtual avatar will be presented on display device 16. As one nonlimiting example, display device 16 may present a first person perspective to human target 32 and may therefore present the portions of the virtual avatar that could be viewed through the virtual eyes of the virtual avatar (e.g., outstretched hands holding a steering wheel, outstretched hands holding a rifle, outstretched hands grabbing a virtual object; in a three-dimensional virtual world, etc.).

While virtual avatar 50 is used as an example aspect of a game that may be controlled by the movements of a human target via the skeletal modeling of a depth map, this is not intended to be limiting. A human target may be modeled with a virtual skeleton, and the virtual skeleton can be used to control aspects of a game or other application other than a virtual avatar. For example, the movement of a human target can control a game or other application even if a virtual avatar is not rendered to the display device.

Figure 3:
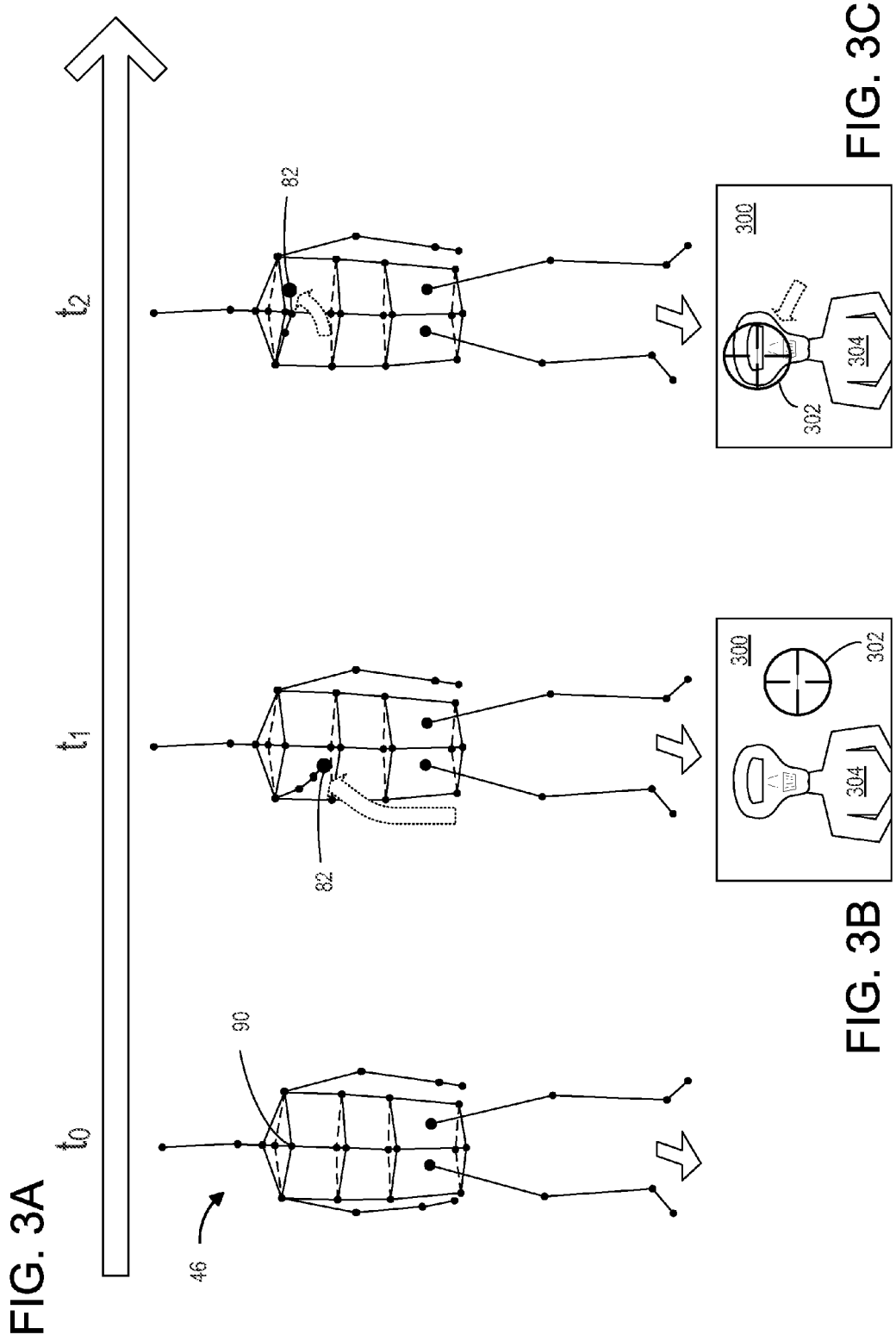

As introduced above, a weapon simulation game (e.g., a first person shooter) may be controlled by the movements of a human target via the skeletal modeling of a depth map. For example, FIGS. 3-16 schematically show a virtual skeleton 46 modeling different gestures of a human target at different moments in time (e.g., time $t_0$, time $t_1$ and time $t_2$). As discussed above, virtual skeleton 46 can be derived from depth information acquired from a depth camera observing the human target. While virtual skeleton 46 is illustrated as a jointed stick figure, it is to be understood that the virtual skeleton may be represented by any suitable machine readable data structure. For example, the joints illustrated as dots in FIG. 3A may be represented by positional coordinates and/or other machine readable information. As such, a logic subsystem of a computing system may receive the virtual skeleton data structure(s) representing the virtual skeleton in machine readable form) and process the position and/or other attributes of one or more joints. In this way, the skeletal position/movement, and therefore the gestures of the modeled human target, may be interpreted as different gestured controls for controlling the computing system.

As a first example, FIG. 3A shows virtual skeleton 46 with arms lowered at time $t_0$. At time $t_1$, the right arm, including a right hand joint 82, of the virtual skeleton is raised. The raising of the arm in front of the torso may be interpreted as a control to initiate weapon aiming. For example, FIG. 3B shows a first person game interface 300 that may be presented to a game player via a display device (e.g., display device 16 of FIG. 1). As shown, at time $t_1$, which corresponds to time $t_1$ of FIG. 3A, an aiming reticle 302 is displayed on the first person game interface to signal to the game player where the game player's virtual weapon is aimed. As shown in FIG. 3B, the game player is off target and is aimed to miss virtual enemy 304.

As indicated at time $t_2$ of FIG. 3A, the virtual skeleton 46 moves the position of right hand joint 82 up and to the right. As illustrated in FIG. 3C, the aiming reticle 302 moves in a corresponding manner up and to the right. In other words, the computing system translates the relative position of the hand joint as a gestured aiming control and aims a virtual weapon in proportion to the gestured aiming vector control. While a hand joint is provided as one example, it is to be understood that other skeletal joints may work equivalently well in the translation of the aiming vector control. In some embodiments, the position, velocity, or other attributes of one or more joints may be taken into consideration.

As introduced above, the transformation of the virtual skeleton models a corresponding movement of a game player (e.g., human target 32 of FIG. 1). As such, the modeling of the game player with the virtual skeleton and the translation of skeletal movements to game actions (e.g., aiming a virtual weapon), allows the game player to control the game with bodily movements and gestures.

In some embodiments, the absolute movement of a hand joint away from a default hand joint position is used as the basis for determining the aiming vector. In some embodiments, the relative position of a hand joint to a shoulder joint or other reference joint is used as the basis for determining the aiming vector.

A default aiming vector (e.g., straight ahead) may be variously selected without departing from the scope of this disclosure. As one example, a default aiming vector may be based off a relative position of the hand joint to one or more other skeletal joints (e.g., a torso joint 90). In some embodiments, a default aiming vector may instead be set to the first hand joint position to which a gamer raises his hand. In some embodiments, the hand joint position that corresponds to the default aiming vector may dynamically change based on gaming situations (e.g., targets at higher elevation than character, targets at lower elevation than character, etc.).

Translation of hand joint movement to aiming vector changes does not have to be 1:1. In some embodiments, an observed hand joint position may be translated into an aiming vector control using a linear or nonlinear translation function, in other words, a certain amount of hand movement may cause different amounts of aiming vector changes depending on the angle of the aiming vector, position of the hand, and/or parameters of the game.

In some embodiments, the computing system may be configured to provide a game player with an aiming assist such that the aiming vector is biased towards valid game targets—i.e., the computing system may infer a desired target and bias aim of the virtual weapon towards the desired target. A relative amount of biasing may be dynamically set according to one or more changeable game parameters. In other words, the first person shooter game may modify, in real time, the degree to which an aiming vector is biased to a valid game target. Such parameters may include gamer level (e.g., beginner, intermediate, expert, etc.), game level (e.g., first warm up mission, final mission against big boss, etc.), virtual weapon selected (e.g., inaccurate pistol, accurate sniper rifle, etc.), character position (e.g., on the run, kneeling to take careful aim, etc.), or virtually any other game parameter.

Various controls may be implemented for firing a virtual weapon. In some embodiments, a trigger control may be activated via voice recognition—i.e., a virtual weapon is fired responsive to a game player saying "fire," "bang", or another trigger word. In some embodiments, a trigger control may be activated in response to a particular skeletal gesture (e.g., while aiming weapon with right hand, left hand taps leg to fire weapon).

Figure 4:
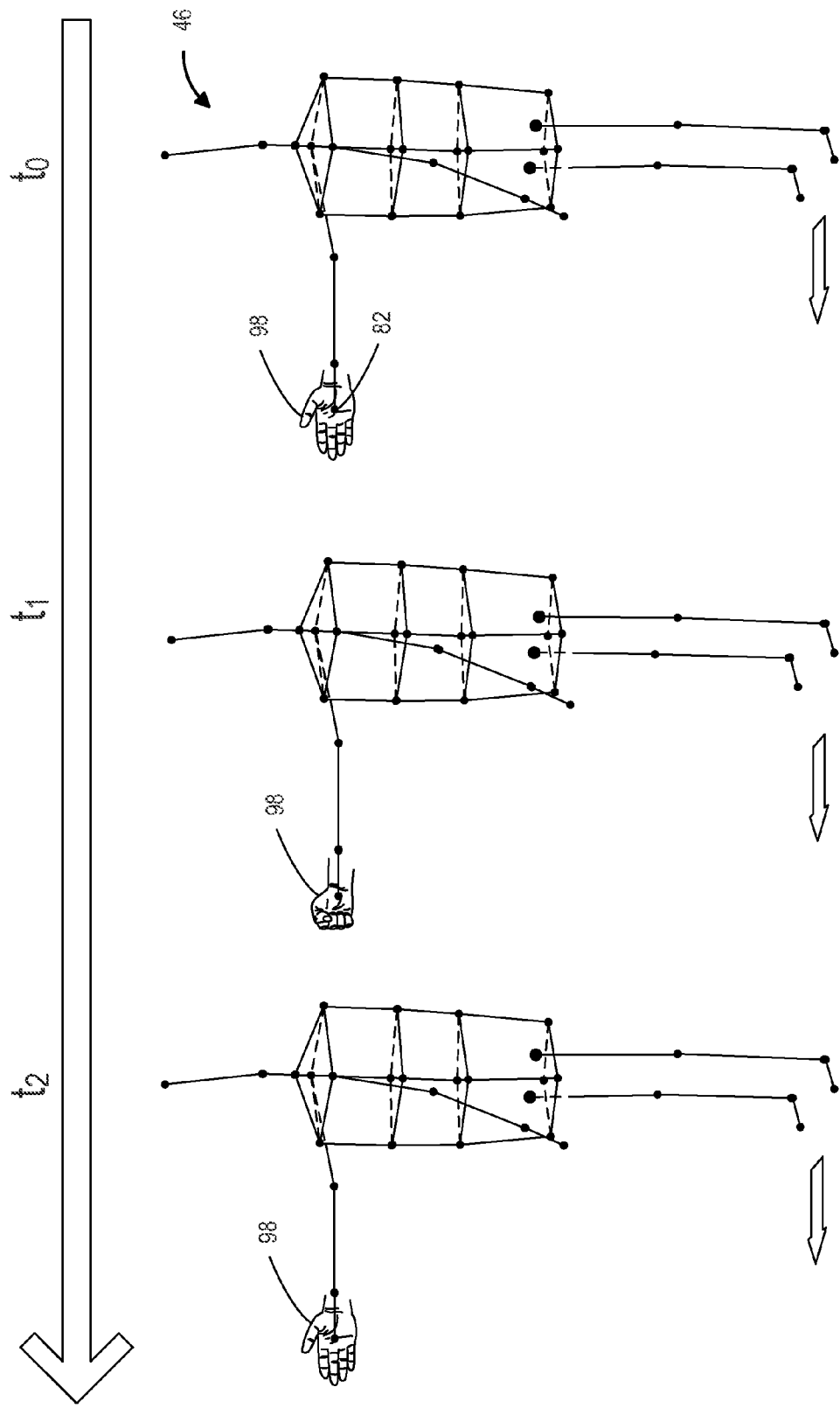

In some embodiments, a posture of a hand modeled by the hand joint of the virtual skeleton may be translated into a gestured trigger control. For example, FIG. 4 shows virtual skeleton 46 with right hand joint 82 raised at time $t_0$. As indicated at time $t_0$, a hand 98 modeled by the right hand joint 82 of the virtual skeleton is in an opened posture. At time $t_1$, hand 98 closes, and at time $t_2$, hand 98 opens. The closing of hand 98 at time $t_1$ can be translated as a gestured trigger control to which the virtual weapon is to be fired. As such, the computing system may fire the virtual weapon in response to the gestured trigger control—i.e., closing of the hand from an open hand posture. In this way, a game player may fire a weapon by clinching an open hand, which is used to aim the weapon, into a fist.

The posture of hand 98 may be determined in any suitable manner. In some embodiments, a hand may be modeled with enough skeletal joints to recognize the posture of the hand from the skeletal data alone. In some embodiments, the position of the hand joint may be used to locate the position of the hand in the corresponding depth map and/or corresponding color image. In such cases, the portion of the depth map and/or color image including the hand may then be evaluated to determine if the hand is in an open or closed posture. For example, the portion of the depth map and/or color image including the hand may be analyzed with reference to a prior trained collection of known hand postures to find a best match hand posture.

The above described firing gestures are not limiting. Virtually any other suitable gesture or triggering event (e.g., voice activation) may be used to fire the virtual weapon.

Figure 5:
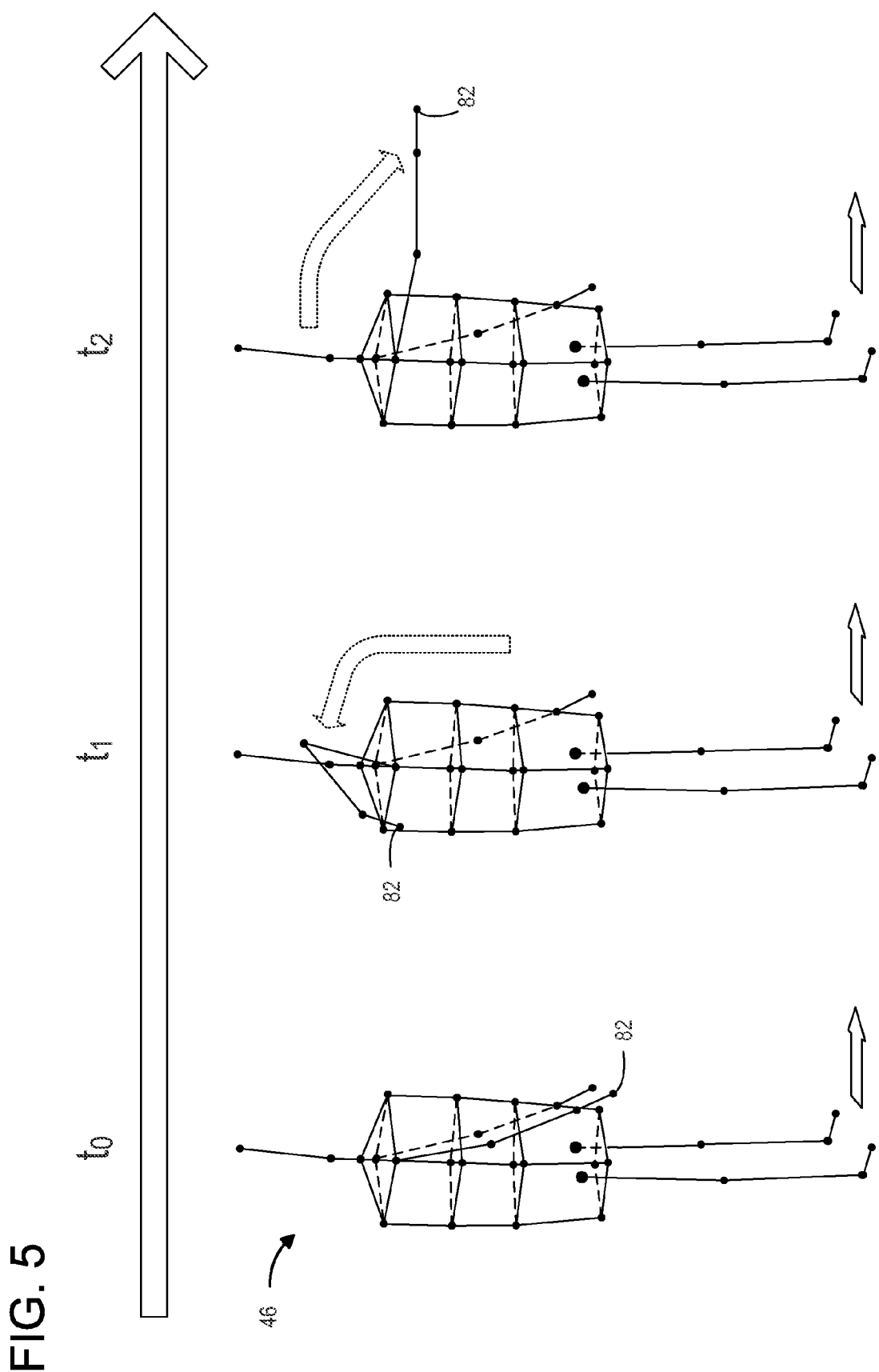

FIG. 5 shows an example skeletal gesture for changing virtual weapons. In some first person shooter games, and other types of games, a character may carry more than one weapon. In such games, the game player may select between the available weapons. For example, a game player may activate a machine gun in some game situations and a grenade launcher in other game situations. The gesture illustrated in FIG. 5 is a nonlimiting example of a gesture that can be used to select between different weapons.

At time $t_0$, virtual skeleton is in the aiming posture with right hand joint 82 in front of the skeleton's torso. In such a scenario, the player character may be aiming a machine gun in the game. At time $t_1$, the right hand joint 82 moves behind a right shoulder joint. Such a movement may be translated into a gestured weapon-change control. The computing system may activate a different virtual weapon in response to the gestured weapon-change control. For example, the machine gun may be replaced by a grenade launcher. As such, at time $t_2$, virtual skeleton is in the same aiming posture as at time $t_0$, but the player character may now be aiming the grenade launcher instead of the machine gun.

In some embodiments, the same gesture may be used to cycle through all available weapons. In some embodiments, each different virtual weapon may be activated using a different gesture. In some embodiments, a shared gesture (e.g., hand behind the shoulder as shown in FIG. 5) may initiate a weapon change procedure, and an auxiliary gesture (e.g., hand tapping leg, elbow flicking while hand behind shoulder, etc.) may be repeated to cycle through available weapons. As with other gestures described herein, other input mechanisms, such as voice recognition, may be used to augment the skeletal gestures. For example, a game player may initiate a weapon change by performing the gesture illustrated FIG. 5, but may specify the desired weapon by saying the name of the weapon while performing the gesture.

Figure 6:
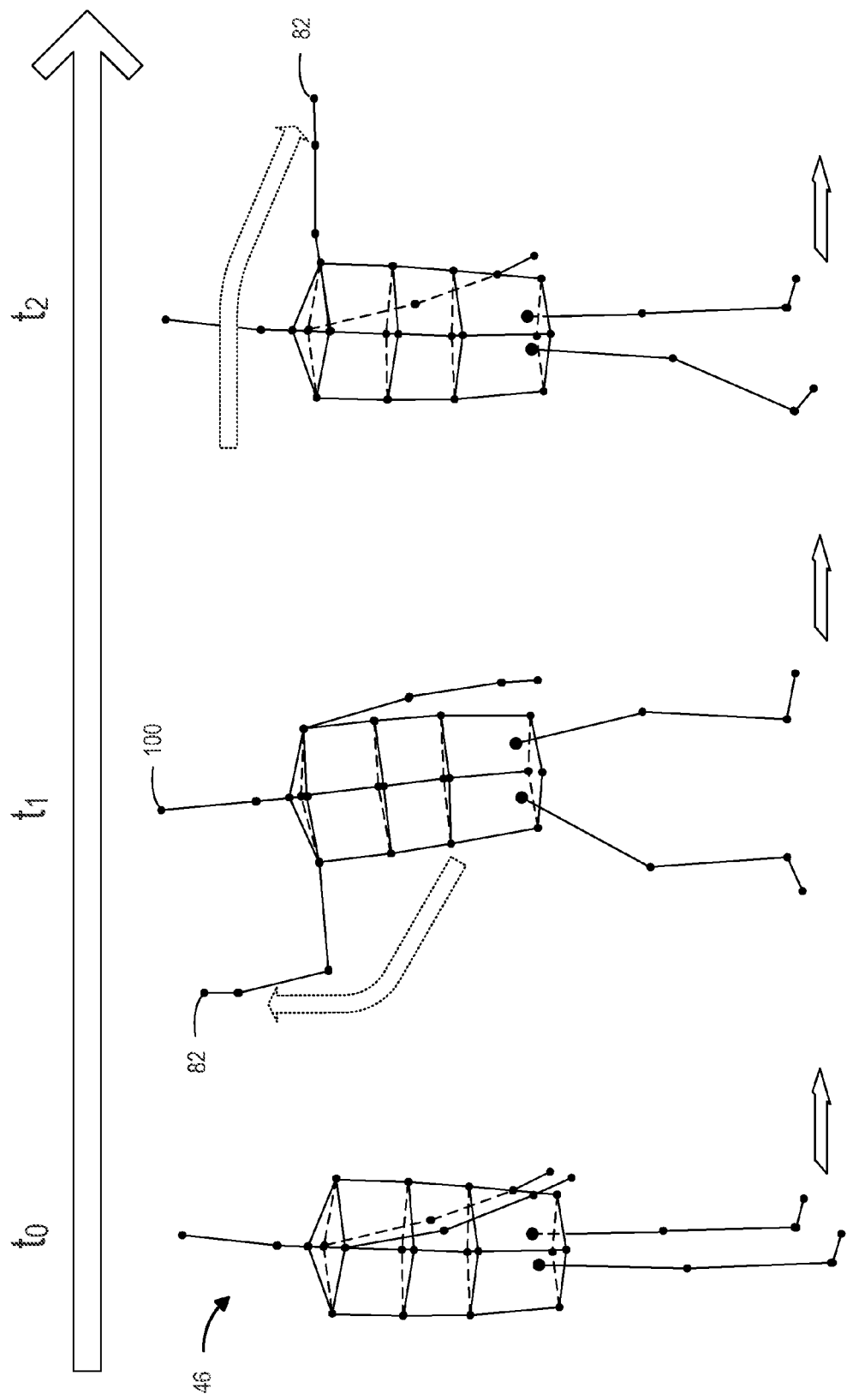

FIG. 6 shows an example skeletal gesture for throwing an object, such as a virtual grenade. At time $t_0$, virtual skeleton 46 is in a standing position with arms down. At time $t_1$, the virtual skeleton 46 winds up by cocking the right hand joint 82 behind the head joint 100. At time $t_2$, the virtual skeleton 46 moves the right hand joint 82 forward in a throwing motion. The computing system may be configured to translate the throwing motion of the hand joint into a gestured grenade control. The game character may throw a virtual grenade in response to the gestured grenade control. While a grenade is provided as an example of a virtual object to be thrown, the grenade throwing gesture may be used to throw any suitable virtual object. Furthermore, other gestures may be translated into a gestured grenade control, and the gesture illustrated in FIG. 6 is provided as a nonlimiting example.

Figure 7:
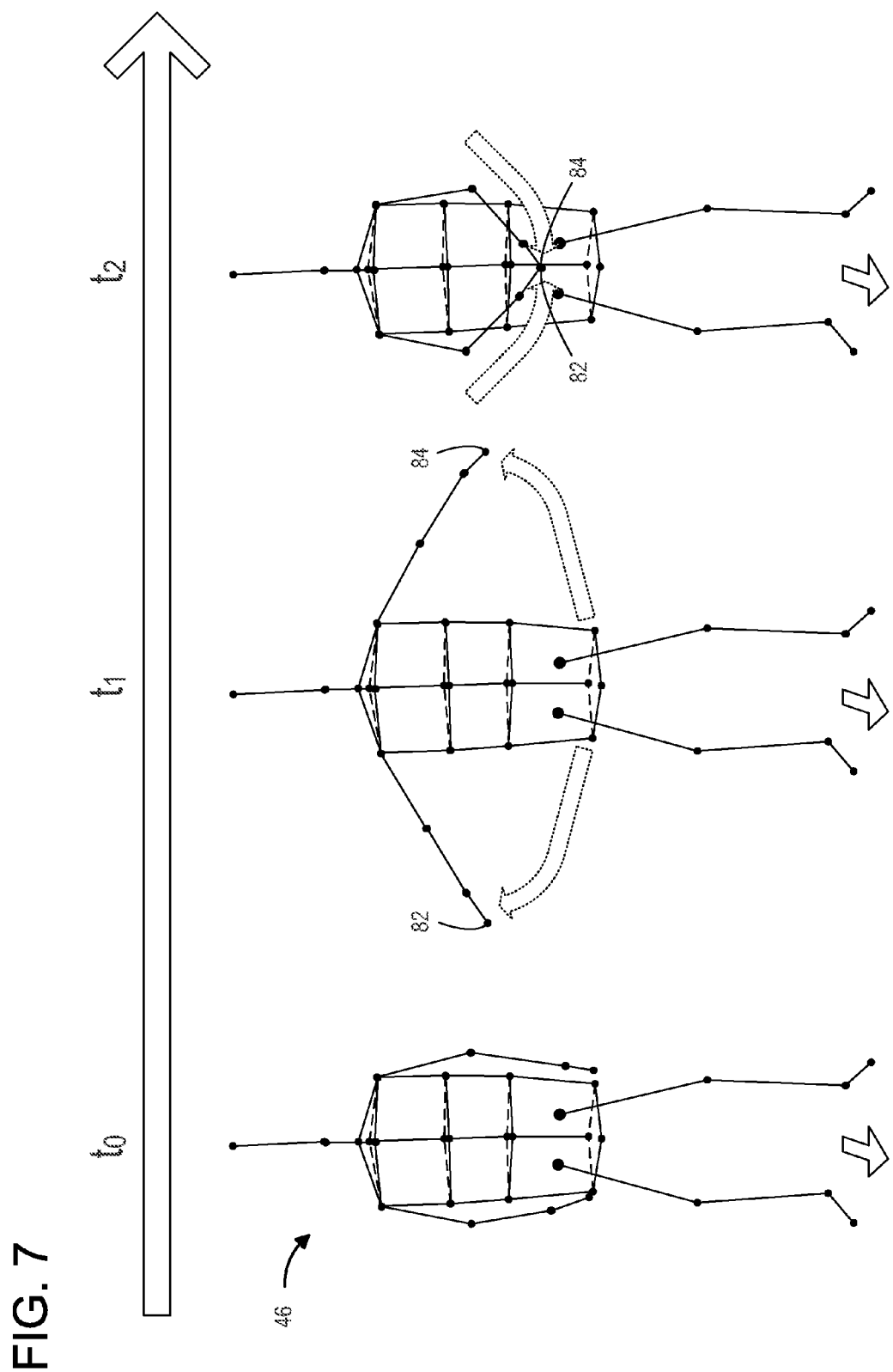
Figure 8:
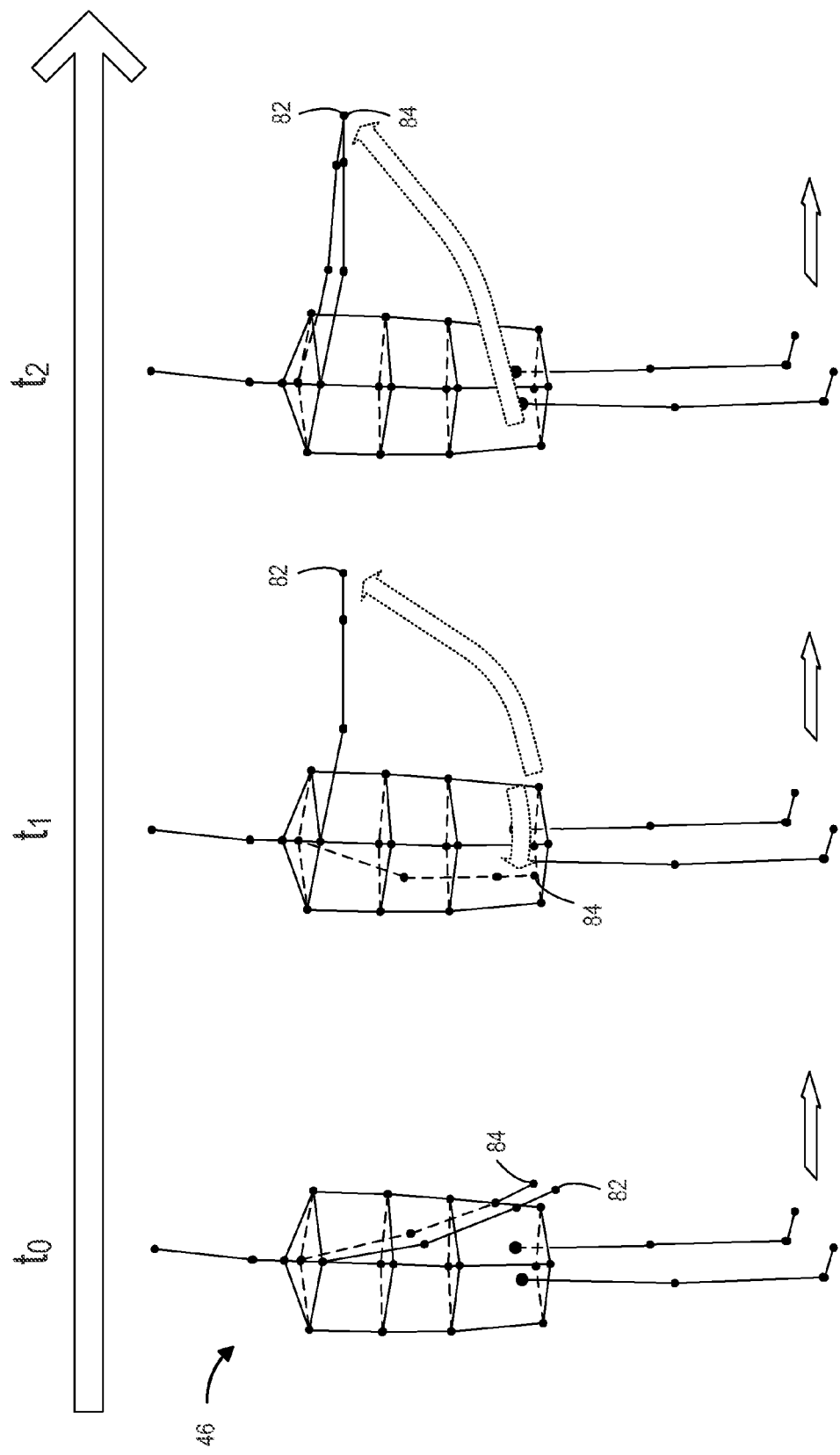

FIG. 7 shows an example skeletal gesture for reloading a virtual weapon with virtual ammunition. At time $t_0$, virtual skeleton 46 is in an aiming posture. At time the virtual skeleton 46 spreads apart the left hand joint 84 and the right hand joint 82. At time $t_2$, the virtual skeleton 46 slaps together the left hand joint 84 and the right hand joint 82 in a clapping motion. The computing system may be configured to translate the clapping into a gestured reload control. The game character may reload the virtual weapon in response to the gestured reload control. FIG. 8 shows another reload gesture in which the game player slaps the left hand joint 84 up to an aiming right hand joint 82, as if inserting a fresh clip into a virtual pistol. These and/or other gestures may be used to reload a virtual weapon.

Figures 9A, 9B, 9C:
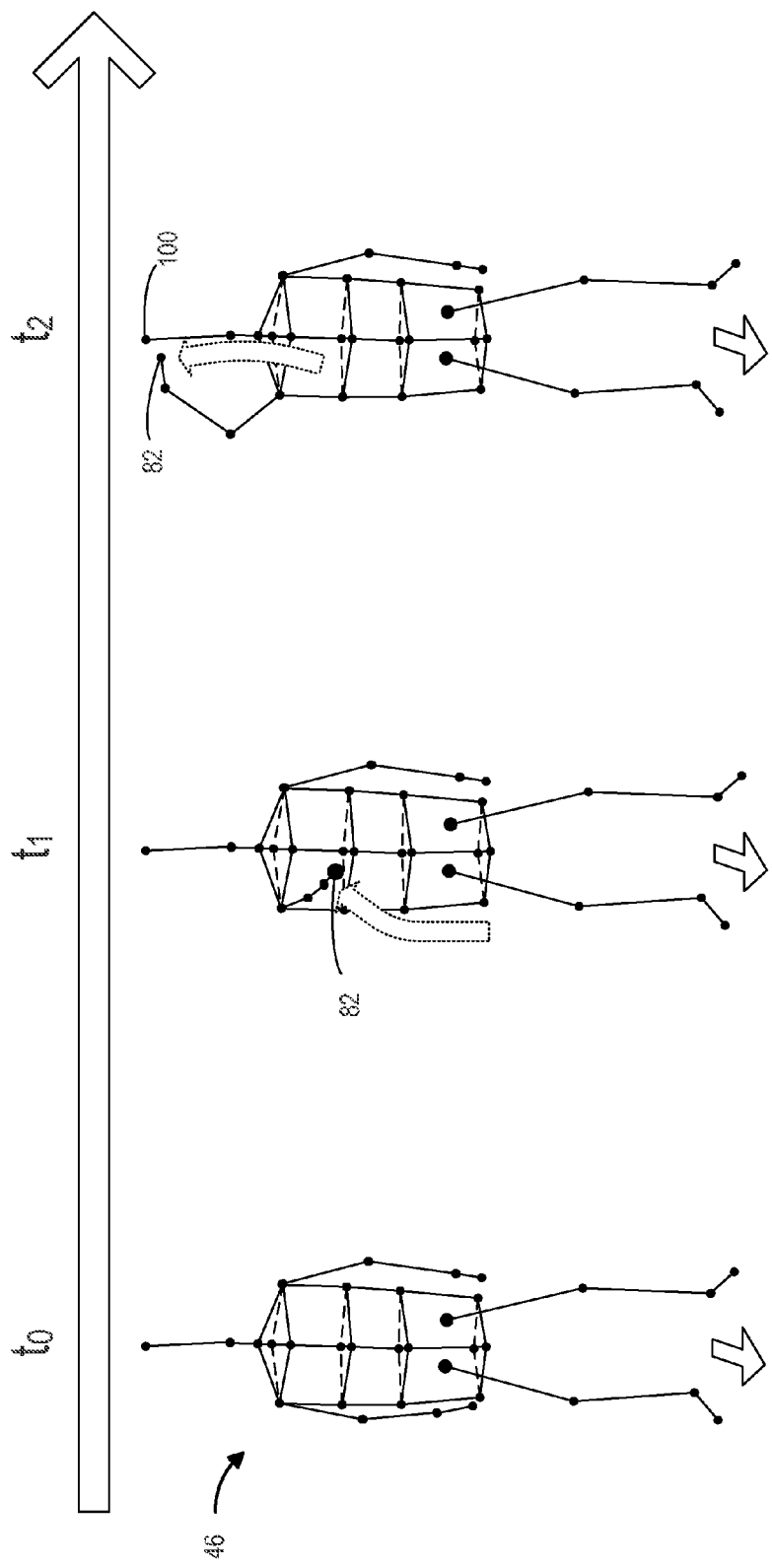

FIG. 9A shows an example skeletal gesture for zooming the sites of a virtual weapon, in particular, at time $t_0$, FIG. 9A shows virtual skeleton 46 with arms lowered. At time $t_1$, the right arm, including a right hand joint 82, of the virtual skeleton is raised. The raising of the arm in front of the torso may be interpreted as a control to initiate weapon aiming. For example, FIG. 9B shows a first person game interface 900 that may be presented to a game player via a display device (e.g., display device 16 of FIG. 1). As shown, at time $t_1$, which corresponds to time $t_1$ of FIG. 9A, an aiming reticle 302 is displayed on the first person game interface to signal to the game player where the game player's virtual weapon is aimed. As shown in FIG. 9B, the virtual enemy 904 is far away. As a result, accurate aiming is difficult.

Figure 10:
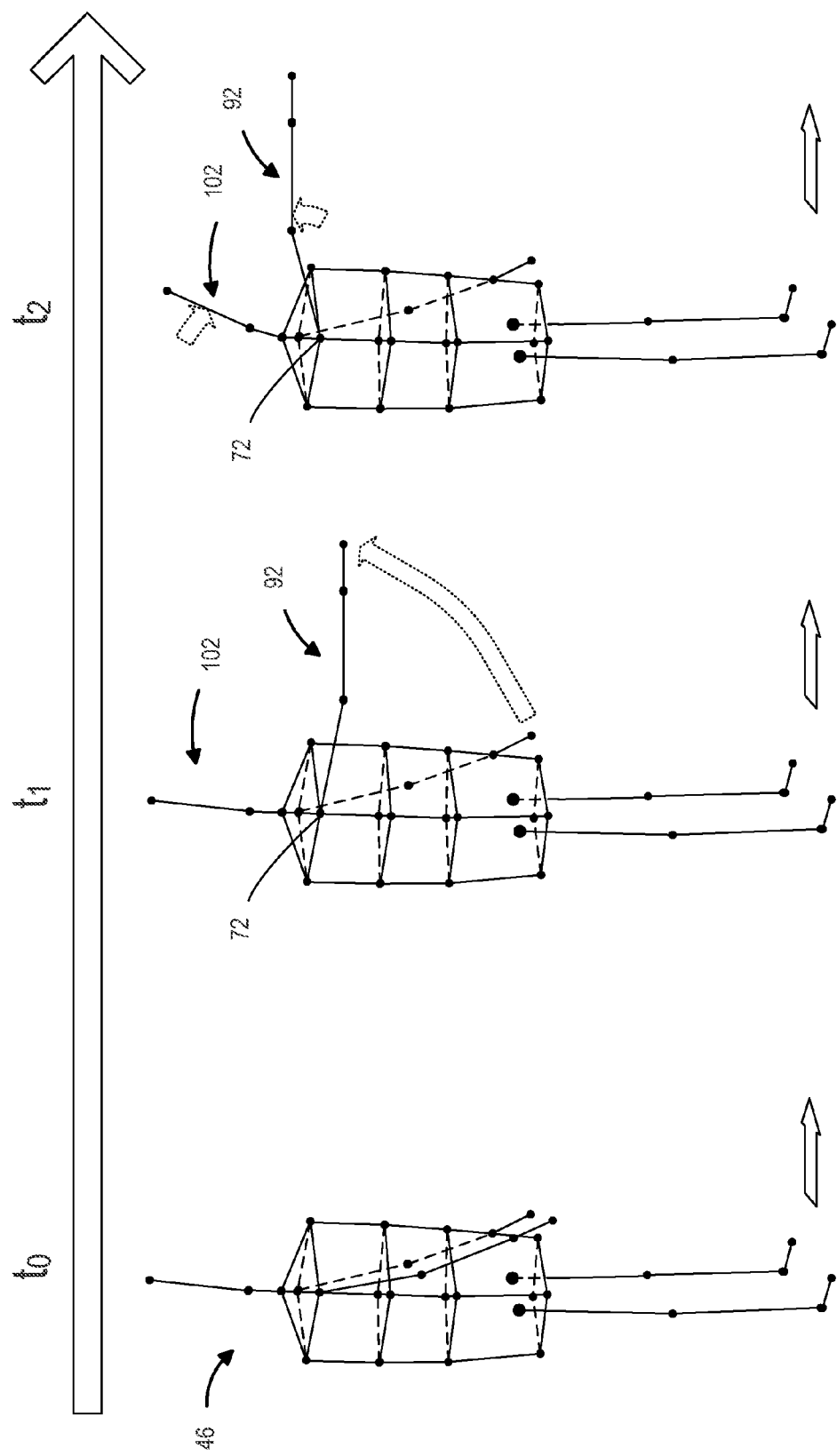

At time $t_2$, the right hand joint 82 of the virtual skeleton 46 is raised near head joint 100. The computing system may be configured to translate a raising of the arm of the virtual skeleton towards a head of the virtual skeleton as a gestured zoom control. As shown in FIG. 9C, at time $t_2$, which corresponds to time $t_2$ of FIG. 9A, a virtual site of the virtual weapon is zoomed in response to the gestured zoom control. As a result, the game player may more accurately aim at the distant virtual enemy 904. FIG. 10 shows another zoom gesture in which the game player raises right arm 92 towards head 102 by shrugging right shoulder 72. This gesture simulates the game player looking down the right arm as if looking down the sites of a rifle. These and/or other gestures may be used to zoom the sites of a virtual weapon.

Figure 11:
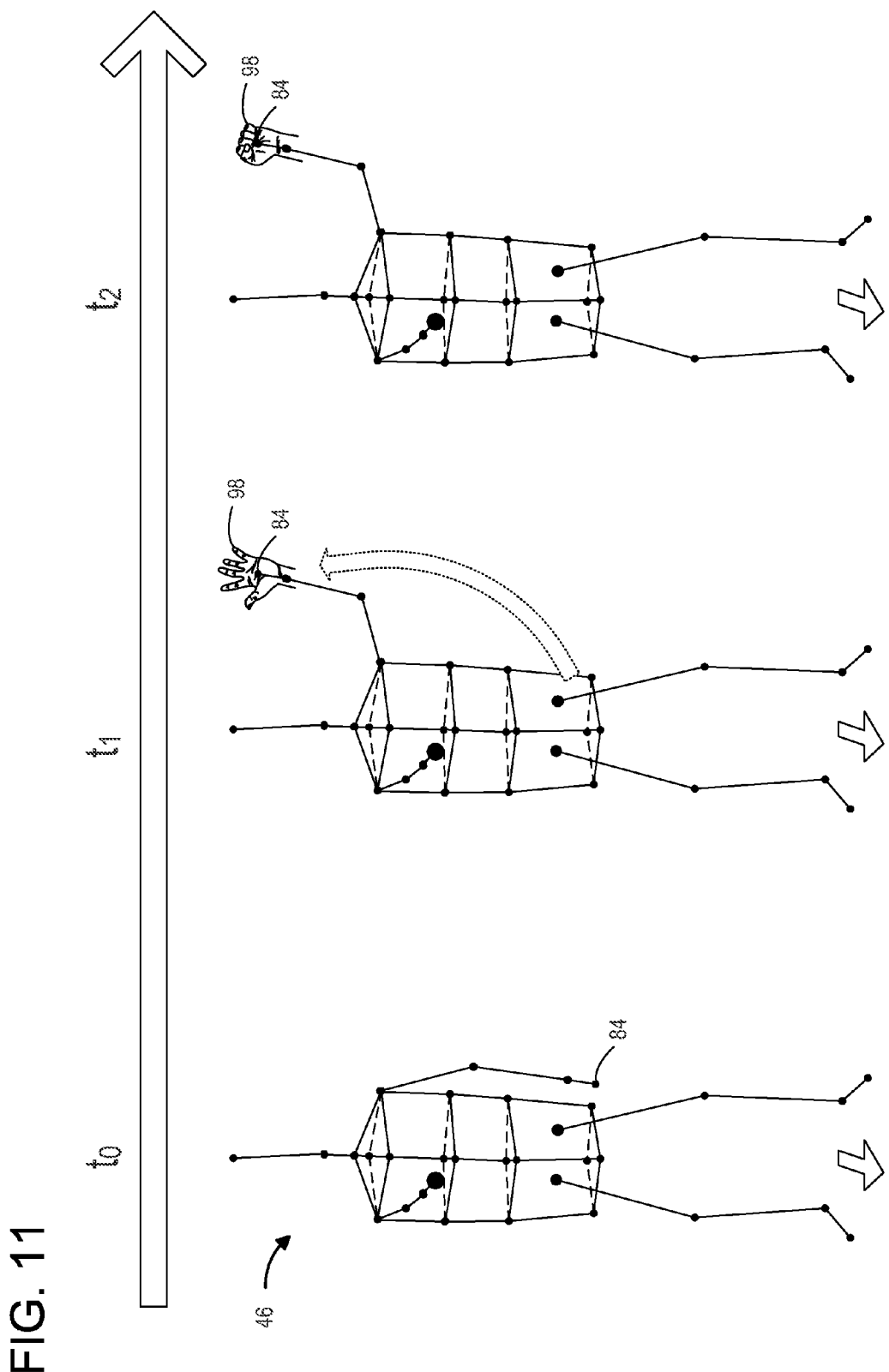

FIG. 11 shows an example skeletal gesture for grabbing a virtual object in the virtual game environment. At time $t_0$, virtual skeleton 46 is in an aiming posture as described above. At time $t_1$, the virtual skeleton 46 reaches a left hand joint towards a virtual object displayed on a display device (e.g., display device 16 of FIG. 1). At time $t_1$, the hand 98 modeled by the left hand joint 84 has an open posture. Such an open posture may be recognized in any suitable manner, including those discussed above with reference to FIG. 4. At time $t_2$, the hand 98 modeled by the left hand joint 84 closes in a grabbing motion. The computing system may be configured to translate a grabbing motion of the left hand joint 84 as a gestured grab control. The game character may grab a virtual object in response to the gestured grab control.

In some embodiments, gestures performed by one hand are interpreted as aiming and firing controls while gestures performed by the other hand are interpreted as grab controls. For example, the right hand aims and the left hand grabs. In some embodiments, one or both hands may aim and fire, and the same hand or hands may be used to grab. Differences in hand joint position, hand posture, and/or game situations may be considered when deciding if a gesture is intended to aim or grab. For example, if no enemies are present, extending the hand in front of the torso may be translated as a grab gesture; but if no objects are present, extending the hand in front of the torso may be translated as an aim gesture.

Gestures performed by a game player (e.g., human target 32 of FIG. 1) may be used to control the movement of a player character within a virtual gaming world. In other words, gestures may be used to move the character forward, backward, left, right, up, down, etc. Furthermore, gestures may be used to turn the character and/or change the direction that the character is looking. It is to be understood that references to "left," "right," "front," "back," and the like are based on the anatomy of the virtual skeleton.

FIG. 12A shows an example skeletal gesture for turning a player-controlled character in a virtual game world. At time $t_0$, virtual skeleton 46 is facing a neutral direction—represented by arrow 56 in FIG. 12A. For example, the neutral direction may be towards the depth camera along an optical axis of the depth camera. FIG. 12B shows a first person shooter game interface 120 at time $t_0$, which corresponds to time $t_0$ of FIG. 12A. The first person shooter game interface 120 of FIG. 12B represents the view of the virtual character controlled by the game player at time $t_0$.

At time $t_1$, the shoulders 70 of virtual skeleton 46 rotate to the right in a twisting motion. The computing system may be configured to translate the rotation of the shoulders of the virtual skeleton as a gestured turn control. As illustrated in FIG. 12C, a viewing direction of the first person shooter game interface 120 may change in response to the gestured turn control. For example, at time $t_1$ of FIG. 12C, which corresponds to time $t_1$ of FIG. 12A, the viewing direction of the first person shooter game interface 120 rotates to the right as if the virtual character turned to look to the right in the virtual game world.

The computing system may additionally or alternatively be configured to translate a position of a left foot joint of a virtual skeleton relative to a position of a right foot joint of the virtual skeleton into a gestured movement control and move a character in response to the gestured movement control.

Figures 13A, 13B, 13C:
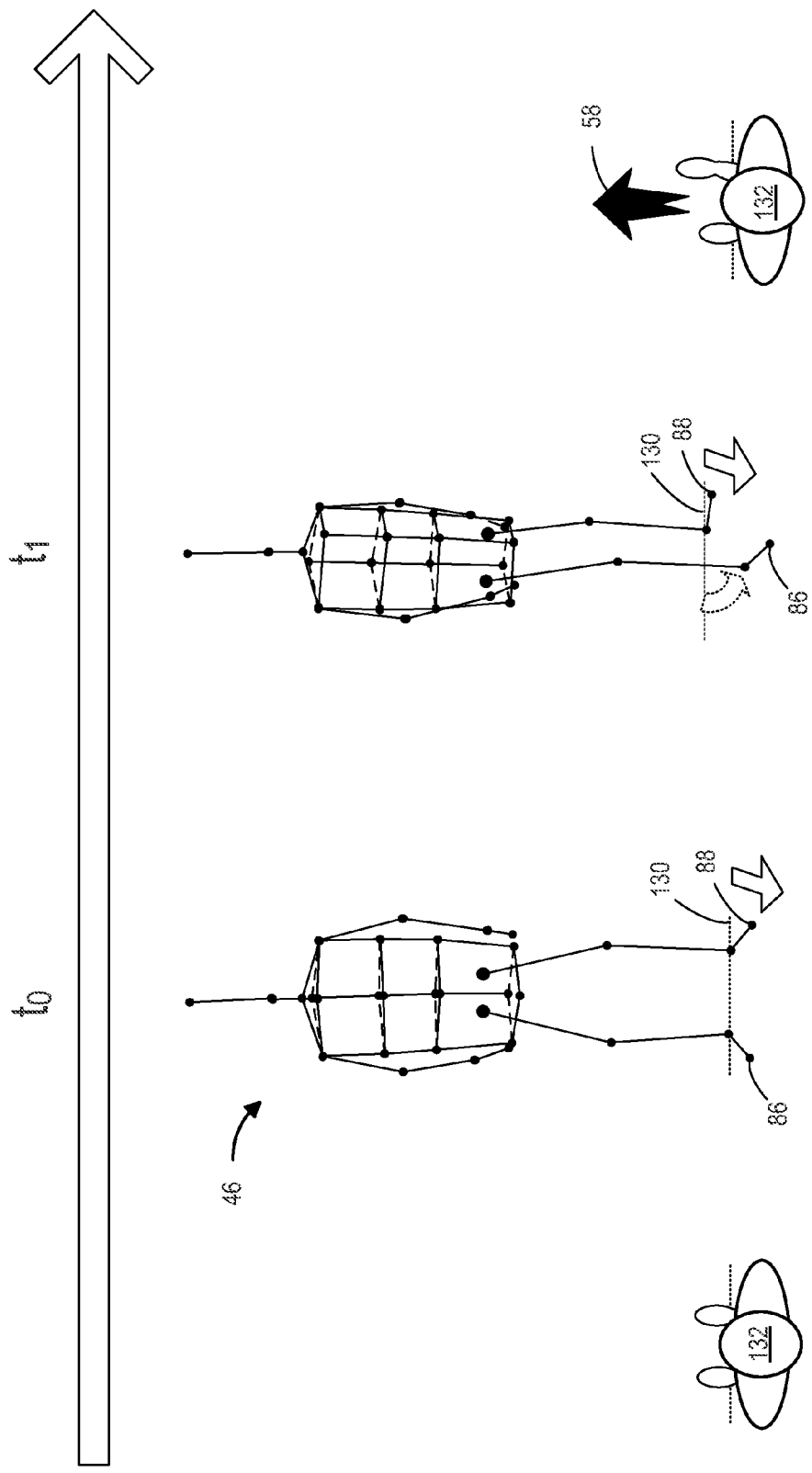

For example, FIG. 13A shows an example skeletal gesture for moving a player controlled character forward in a virtual game world. At time $t_0$, virtual skeleton 46 is standing with feet together approximately a same distance from the depth camera, as indicated by reference line 130. FIG. 13B somewhat schematically shows a top view of the player-controlled character 132 in the virtual game world at time $t_0$, which corresponds to time $t_0$ of FIG. 13A.

At time $t_1$, a right foot joint 86 steps forward relative to a stationary left foot joint 88. A right foot joint in front of the left foot, joint may be translated as continuous forward movement—i.e., stepping forward with a right foot may cause the player character to walk forward. The player character may continue to walk forward until the human target returns the right foot hack next to the left foot. For example, FIG. 13C somewhat schematically shows a top view of the player-controlled character 132 in the virtual game world at time $t_1$, which corresponds to time $t_1$ of FIG. 13A. Arrow 58 of FIG. 13C is included to indicate forward movement of player-controlled character 132. While forward movement of the right foot is used as an example, a left foot forward is an equivalent gesture that may also be translated as continuous forward movement. For example, movement of either foot relative to a stationary foot may be used as the basis for gesture interpretation.

As another example of movement control, FIG. 14A shows an example skeletal gesture for moving a player-controlled character backward in a virtual game world. At time $t_0$, virtual skeleton 46 is standing with feet together approximately a same distance from the depth camera, as indicated by reference line 130. FIG. 14B somewhat schematically shows a top view of the player-controlled character 132 in the virtual game world at time $t_0$, which corresponds to time $t_0$ of FIG. 14A.

At time $t_1$, a right foot joint 86 steps backward relative to a stationary left foot joint 88. A right foot joint behind the left foot joint may be translated as continuous backward movement—i.e., stepping backward with a right foot may cause the player character to walk backwards. The player character may continue to walk backwards until the human target returns the right foot back next to the left foot. For example, FIG. 14C somewhat schematically shows a top view of the player-controlled character 132 in the virtual game world at time $t_1$, which corresponds to time $t_1$ of FIG. 14A. Arrow 62 of FIG. 14C is included to indicate backward movement of player-controlled character 132. As noted above, movement of the right foot is provided as a nonlimiting example, and movement of either foot relative to a stationary foot may be used as the basis for gesture interpretation.

As another example of movement control, FIG. 15A shows an example skeletal gesture for moving a player-controlled character to the right in a virtual game world. At time $t_0$, virtual skeleton 46 is standing with feet together approximately a same distance from the depth camera, as indicated by reference line 130. FIG. 15B somewhat schematically shows a top view of the player-controlled character 132 in the virtual game world at time $t_0$, which corresponds to time $t_0$ of FIG. 15A.

At time a right foot joint 86 moves laterally away from a stationary left foot joint 88. A right foot joint stretched to the right of the left foot joint may be translated as continuous right shuffle movement—i.e., stepping out to the right with a right foot may cause the player character to move to the right without turning to the right. The player character may continue to shuffle to the right until the human target returns the right foot back next to the left foot. For example, FIG. 15C somewhat schematically shows a top view of the player-controlled character 132 in the virtual game world at time $t_1$, which corresponds to time $t_1$ of FIG. 15A. Arrow 64 of FIG. 15C is included to indicate right shuffle movement of player-controlled character 132.

As another example of movement control, FIG. 16A shows an example skeletal gesture for moving a player-controlled character to the left in a virtual game world. At time $t_0$, virtual skeleton 46 is standing with feet together approximately a same distance from the depth camera, as indicated by reference line 130, FIG. 16B somewhat schematically shows a top view of the player-controlled character 132 in the virtual game world at time $t_0$, which corresponds to time $t_0$ of FIG. 16A.

At time a left foot joint 88 moves laterally away from a stationary right foot joint 86. A left foot joint stretched to the left of the right foot joint may be translated as continuous left shuffle movement—i.e. stepping out to the left with a left foot may cause the player character to move to the left without turning to the left. The player character may continue to shuffle to the left until the human target returns the left foot back next to the right foot. For example, FIG. 16C somewhat schematically shows a top view of the player-controlled character 132 in the virtual game world at time $t_1$, which corresponds to time $t_1$ of FIG. 16A. Arrow 66 of FIG. 16C is included to indicate left shuffle movement of player-controlled character 132.

The above described gesture/controls are nonlimiting examples. Other gestures and controls are within the scope of this disclosure. Furthermore, two or more of the above described gestures may be simultaneously executed and translated. For example, a game player may cause a player-controlled character to run in a right-turning are while firing a weapon at virtual enemies by stepping a right foot forward, twisting shoulders to the right, and lifting a right arm in front of the torso while opening and closing the right hand.

In some embodiments, the translation of a gesture into a game control may be affected by the posture of the virtual skeleton. For example, if the right foot is extended forward, right twisting motions may be interpreted with increased sensitivity—i.e., less twisting of the skeleton is needed to cause relatively more turning of the player-controlled character. Such a modification may be used to counter the body mechanics of the human target. For example, a human target may feel as if they are twisting as much when twisting towards a forward foot, when in fact the human target twists less when twisting towards a forward foot than when twisting away from a forward foot.

While described with reference to a first person shooter, the gestures described above may be applied to other games or applications. Furthermore, the gestures described above may be used to control physical avatars, such as robots.

While the gestures described above are described with reference to the visual representation of the virtual skeletons, it is to be understood that the gestures may be analyzed with reference to the skeletal data that constitutes the virtual skeleton. Each gesture may be analyzed using one or more tests. Each such test may consider the position, velocity, acceleration, orientation, or other attributes of one or more joints. Such attributes may be considered in an absolute sense, or with reference to one or more other joints. As nonlimiting examples, a gesture may be identified by the absolute position of a joint, the relative positions of two or more joints with respect to one another, the angle of a bone segment connecting two joints relative to the angle of another bone segment connecting two joints, and/or a combination of the above or other attributes.

In some embodiments, the above described methods and processes may be tied to a computing system including one or more computers. In particular, the methods and processes described herein may be implemented as a computer application, computer service, computer API, computer library, and/or other computer program product.

FIG. 17 schematically shows a nonlimiting computing system 700 that may perform one or more of the above described methods and processes. Computing system 700 is shown in simplified form. It is to be understood that virtually any computer architecture may be used without departing from the scope of this disclosure. In different embodiments, computing system 700 may take the form of a mainframe computer, server computer, desktop computer, laptop computer, tablet computer, home entertainment computer, network computing device, mobile computing device, mobile communication device, gaming device, etc.

Computing system 700 includes a logic subsystem 702 and a data-holding subsystem 704. Computing system 700 may optionally include a display subsystem 706, capture device 708, and/or other components not shown in FIG. 10. Computing system 700 may also optionally include user input devices such as keyboards, mice, game controllers, cameras, microphones, and/or touch screens, for example.

Logic subsystem 702 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 704 may include one or more physical, non-transitory, devices configured to hold data and/or instructions executable by the logic subsystem to implement the herein described methods and processes. When such methods and processes are implemented, the state of data-holding subsystem 64 may be transformed (e.g., to hold different data).

Data-holding subsystem 704 may include removable media and/or built-in devices. Data-holding subsystem 704 may include optical memory devices CD, DVD, HD-DVD, Blu-Ray Disc, etc.), semiconductor memory devices (e.g., RAM, EPROM, EEPROM, etc.) and/or magnetic memory devices hard disk drive, floppy disk drive, tape drive, MRAM, etc.), among others. Data-holding subsystem 704 may include devices with one or more of the following characteristics: volatile, nonvolatile, dynamic, static, read/write, read-only, random access, sequential access, location addressable, file addressable, and content addressable. In some embodiments, logic subsystem 702 and data-holding subsystem 704 may be integrated into one or more common devices, such as an application specific integrated circuit or a system on a chip.

FIG. 17 also shows an aspect of the data-holding subsystem in the form of removable computer-readable storage media 710, which may be used to store and/or transfer data and/or instructions executable to implement the herein described methods and processes. Removable computer-readable storage media 710 may take the form of CDs, DVDs, HD-DVDs, Blu-Ray Discs, EEPROMs, and/or floppy disks, among others.

It is to be appreciated that data-holding subsystem 704 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

When included, display subsystem 706 may be used to present a visual representation of data held by data-holding subsystem 704 (e.g., a virtual avatar and/or a three-dimensional virtual world). As the herein described methods and processes change the data held by the data-holding subsystem, and thus transform the state of the data-holding subsystem, the state of display subsystem 706 may likewise be transformed to visually represent changes in the underlying data. For example, computing system 700 may be configured to render a driving game for display on a display device of display subsystem 706. As such, computing system 700 may include a display output; to output the driving game interface to the display device. Display subsystem 706 may include one or more display devices utilizing virtually any type of technology. Such display devices may be combined with logic subsystem 702 and/or data-holding subsystem 704 in a shared enclosure, or such display devices may be peripheral display devices connected to the logic subsystem via a display output.

When included, a communication subsystem may be configured to communicatively couple computing system 700 with one or more other computing devices. The communication subsystem may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 700 to send and/or receive messages to and/or from other devices via a network such as the Internet.

Computing system 700 further may include an integrated and/or peripheral capture device 708 configured to obtain depth-images of one or more targets. In either case, computing system 700 may include a peripheral input to receive depth images from a depth camera and deliver the received depth images to the logic subsystem for processing. Capture device 708 may be configured to capture video with depth information via any suitable technique (e.g., time-of-flight, structured light, stereo image, etc.). As such, capture device 708 may include a depth camera, a video camera, stereo cameras, and/or other suitable capture devices.

For example, in time-of-flight analysis, the capture device 708 may emit infrared light to the target and may then use sensors to detect the backscattered light from the surface of the target. In some cases, pulsed infrared light may be used, wherein the time between an outgoing light pulse and a corresponding incoming light pulse may be measured and used to determine a physical distance from the capture device to a particular location on the target. In some cases, the phase of the outgoing light wave may be compared to the phase of the incoming light wave to determine a phase shift, and the phase shift may be used to determine a physical distance from the capture device to a particular location on the target.

In another example, time-of-flight analysis may be used to indirectly determine a physical distance from the capture device to a particular location on the target by analyzing the intensity of the reflected beam of light over time, via a technique such as shuttered light pulse imaging.

In another example, structured light analysis may be utilized by capture device 708 to capture depth information. In such an analysis, patterned light (i.e., light displayed as a known pattern such as grid pattern, a stripe pattern, a constellation of dots, etc.) may be projected onto the target. Upon striking the surface of the target, the pattern may become deformed, and this deformation of the pattern may be studied to determine a physical distance from the capture device to a particular location on the target.

In another example, the capture device may include two or more physically separated cameras that view a target from different angles to obtain visual stereo data. In such cases, the visual stereo data may be resolved to generate a depth-image.

In other embodiments, capture device 708 may utilize other technologies to measure and/or calculate depth values. Additionally, capture device 708 may organize the calculated depth information into "Z layers," layers perpendicular to a Z axis extending from the depth camera along its line of sight to the target.

In some embodiments, two or more different cameras may be incorporated into an integrated capture device. For example, a depth camera and a video camera (e.g., RGB video camera) may be incorporated into a common capture device. In some embodiments, two or more separate capture devices may be cooperatively used. For example, a depth camera and a separate video camera may be used. When a video camera is used, it may be used to provide target tracking data, confirmation data for error correction of target tracking, image capture, face recognition, high-precision tracking of fingers (or other small features), light sensing, and/or other functions.

It is to be understood that at least some target analysis and tracking operations may be executed by a logic machine of one or more capture devices. A capture device may include one or more onboard processing units configured to perform one or more target analysis and/or tracking functions. A capture device may include firmware to facilitate updating such onboard processing logic. Computing system 700 may optionally include one or more input devices, such as controller 712 and controller 714. Input devices may be used to control operation of the computing system. In the context of a game, input devices, such as controller 712 and/or controller 714 can be used to control aspects of a game not controlled via the target recognition, tracking, and analysis methods and procedures described herein. In some embodiments, input devices such as controller 712 and/or controller 714 may include one or more of accelerometers, gyroscopes, infrared target/sensor systems, etc., which may be used to measure movement of the controllers in physical space. In some embodiments, the computing system may optionally include and/or utilize input gloves, keyboards, mice, track pads, trackballs, touch screens, buttons, switches, dials, and/or other input devices. As will be appreciated, target recognition, tracking, and analysis may be used to control or augment aspects of a game, or other application, conventionally controlled by an input device, such as a game controller. In some embodiments, the target tracking described herein can be used as a complete replacement to other forms of user input, while in other embodiments such target tracking can be used to complement one or more other forms of user input.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A data holding device holding instructions executable by a logic subsystem to:
 render a first person shooter game interface for display on a display device;
 receive a virtual skeleton including a plurality of joints, the virtual skeleton providing a machine readable representation of a human target observed with a three-dimensional depth camera;
 translate a relative position of a hand joint of the virtual skeleton as a gestured aiming vector control; and
 aim a virtual weapon in proportion to the gestured aiming vector control.

2. The data holding device of claim 1, further holding instructions executable by the logic subsystem to:
 translate a posture of a hand modeled by the hand joint of the virtual skeleton into a gestured trigger control; and
 fire the virtual weapon in response to the gestured trigger control.

3. The data holding device of claim 2 wherein the virtual weapon is fired responsive to a closing of the hand from an open hand posture.

4. The data holding device of claim 1, further holding instructions executable by the logic subsystem to:
 translate a movement of the hand joint behind a shoulder joint into a gestured weapon-change control; and
 activate a different virtual weapon in response to the gestured weapon-change control.

5. The data holding device of claim 1, further holding instructions executable by the logic subsystem to:
 translate a throwing motion of the hand joint into a gestured grenade control; and
 throw a virtual grenade in response to the gestured grenade control.

6. The data holding device of claim 1, further holding instructions executable by the logic subsystem to:
 translate a clapping of the hand joint with another hand joint into a gestured reload control; and
 reload the virtual weapon in response to the gestured reload control.

7. The data holding device of claim 1, further holding instructions executable by the logic subsystem to:
 translate a raising of the arm of the virtual skeleton towards a head of the virtual skeleton as a gestured zoom control; and
 zoom a virtual site of the virtual weapon in response to the gestured zoom control.

8. The data holding device of claim 1, further holding instructions executable by the logic subsystem to:
 translate a grabbing motion of another hand joint of the virtual skeleton as a gestured grab control; and
 grab a virtual object in response to the gestured grab control.

9. The data holding device of claim 1, further holding instructions executable by the logic subsystem to:
 translate a rotation of shoulders of the virtual skeleton as a gestured turn control; and
 change a viewing direction of the first person shooter game interface in response to the gestured turn control.

10. The data holding device of claim 1, further holding instructions executable by the logic subsystem to:
 translate a position of a left foot joint of the virtual skeleton relative to a position of a right foot joint of the virtual skeleton into a gestured movement control; and
 move a character in response to the gestured movement control.

11. The data holding device of claim 10, wherein a moved foot joint in front of a stationary foot joint is translated as continuous forward movement.

12. The data holding device of claim 10, wherein a moved foot joint behind a stationary foot joint is translated as continuous backwards movement.

13. The data holding device of claim 10, wherein movement of a right foot joint laterally away from the left foot joint is translated as continuous right shuffle movement and movement of the left foot joint laterally away from the right foot joint is translated as continuous left shuffle movement.

14. The data holding device of claim 1, further holding instructions executable by the logic subsystem to infer a desired target and bias aim of the virtual weapon towards the desired target.

15. The data holding device of claim 14, wherein an amount of biasing is dynamically set according to one or more changeable game parameters.

16. A data holding device holding instructions executable by a logic subsystem to:
 render a first person shooter game interface for display on a display device;
 receive a virtual skeleton including a plurality of joints, the virtual skeleton providing a machine readable representation of a human target observed with a three-dimensional depth camera;
 translate a rotation of the left shoulder joint and the right shoulder joint as a gestured turn control;

change a viewing direction of the first person game interface in response to the gestured turn control;
translate a position of the left foot joint of the virtual skeleton relative to a position of the right foot joint of the virtual skeleton into a gestured movement control; and
move a character in response to the gestured movement control.

17. The data holding device of claim 16, wherein a moved foot joint in front of a stationary foot joint is translated as continuous forward movement.

18. The data holding device of claim 16, wherein a moved foot joint behind a stationary foot joint is translated as continuous backwards movement.

19. The data holding device of claim 16, wherein movement of a right foot; joint laterally away from the left foot joint is translated as continuous right shuffle movement and movement of the left foot joint laterally away from the right foot joint is translated as continuous left shuffle movement.

20. A data holding device holding instructions executable by a logic subsystem to:

render a first person shooter game interface for display on a display device;
receive a virtual skeleton including a plurality of joints, the virtual skeleton providing a machine readable representation of a human target observed with a three-dimensional depth camera;
translate a relative position of the hand joint as a gestured aiming vector control;
aim a virtual weapon in proportion to the gestured aiming vector control;
translate a rotation of the left shoulder joint and the right shoulder joint as a gestured turn control;
change a viewing direction of the first person shooter game interface in response to the gestured turn control;
translate a position of the left foot joint relative to a position of the right foot joint into a gestured movement control; and
move a character in response to the gestured movement control.

* * * * *